Jan. 3, 1950 W. RUKA 2,493,315
COASTER PAN
Filed Aug. 16, 1946

INVENTOR.
WILLIAM RUKA
BY
ATTORNEYS.

Patented Jan. 3, 1950

2,493,315

UNITED STATES PATENT OFFICE 2,493,315

COASTER PAN

William Ruka, Racine, Wis.

Application August 16, 1946, Serial No. 691,119

1 Claim. (Cl. 280—12)

My invention refers to coasters and it has for its primary object to provide a concavo-concave circular coaster pan for sliding upon an inclined plane, it being understood that the party using the same, rides in the pan, which has handles thereon and by shifting the weight of the body, as the pan slides downhill it will also rotate in opposite directions conforming to the tipped position of the pan from one side to the other.

In the use of this pan, children may safely manipulate the same, either in a sitting position or in an upright position, it being understood that the handles for convenience may be in a series about the periphery of the pan, and that in some cases flexible handles of sufficient length may be provided for standing riding, in the manner now employed in surfboards.

With the above and other objects in view, which will appear as the description proceeds, the invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Referring by characters to the drawings, 1 indicates a concavo-concaved pan fabricated from any suitable material.

The edge of the pan is reinforced by a bead in which is housed a strengthening wire 2. The circular edge of the pan is provided with a pair of apertures 3, 3, for the reception of flexible handles 4, which handles, in this exemplification of my invention, are rope sections knotted at the ends to confine them in the apertures.

It is understood, however, while I have illustrated only a pair of handles, a series of the same may be spaced about the periphery of the pan and said handles may be either of rigid or flexible material. It is further understood that handles more or less great length may be employed, where the party using the coaster pan may stand erect in the same, if desired.

It is further understood, while I have illustrated a single person seated in the pan for coasting, gripping the pair of handles, two or more parties may be conveniently seated in said pan.

Figure 1:
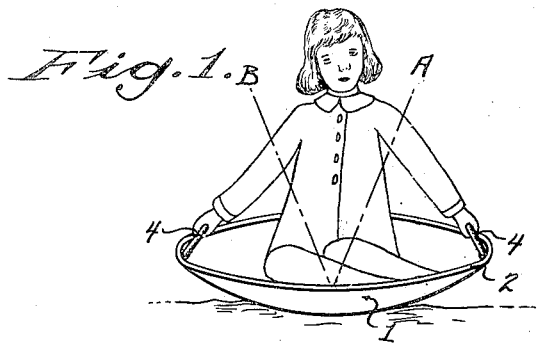
Fig. 1 represents a perspective view of the coaster pan embodying the features of my invention.
Figure 2:
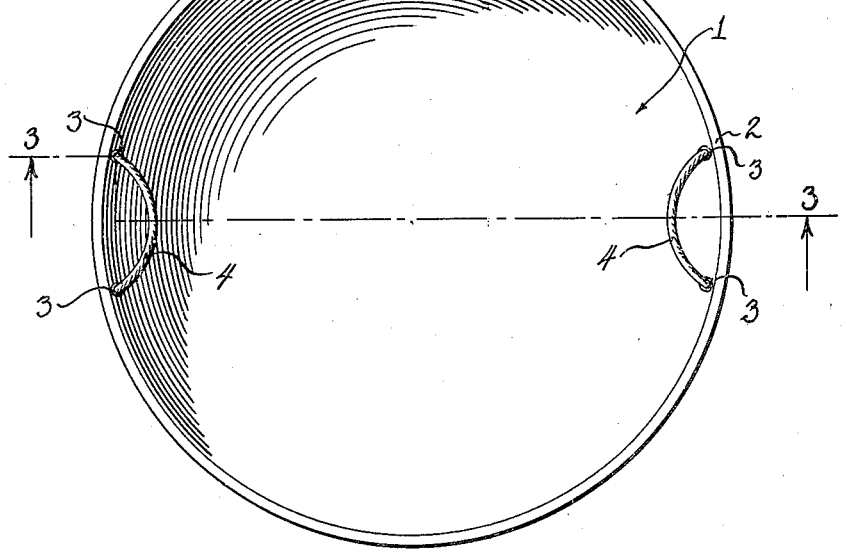
Fig. 2 is a plan view of the same upon an enlarged scale.
Figure 3:
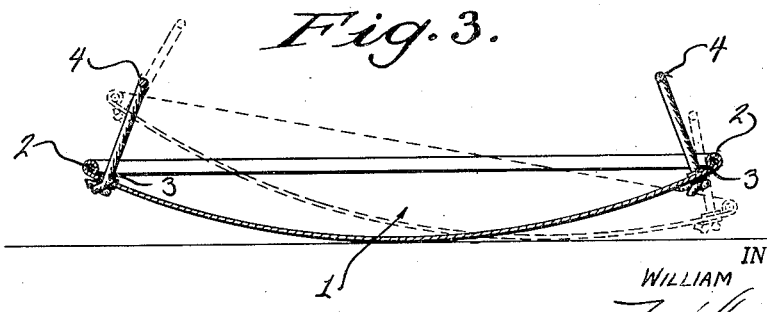
Fig. 3 is a cross section of the pan, the section being indicated by line 3—3 of Figure 2.

From the foregoing description, in the operation of the device, the pan may be tilted in any direction to change the point of ground contact and as indicated, in dotted lines of Figure 3, when the pan is so tilted, as it slides down the incline, it will rotate in one direction. To reverse the direction of rotation, the pan is tilted in the opposite direction from that described. It is understood that the weight of the user will be inclined in the direction, as indicated by the dotted line A or in the direction, as indicated by the dotted line B.

Owing to the fact that the knotted ends of the handles extend below the rim of the pan, when said pan is tilted, the handle knots will engage the snow covered ground surface and serve as brake shoes, whereby the speed of the pan is slowed up in its travel and will slowly rotate in either clockwise or a reversed direction depending upon which side of the pan is tilted by shifting of the weight to a center of gravity eccentric to the pan center.

The pan is particularly used as a coaster in winter under snow and iced conditions, but it is understood that the pan may also be used on any inclined surface, as for example, upon a sodded hillside or in amusement resorts upon a smooth inclined floor.

While I have particularly described my pan for sliding purposes, it should be understood that the pan may be also used for indoor or outside exercising device wherein the occupant may gyrate or rock the pan to develop various evolutions whereby the party therein will exercise various muscles.

I claim:

As a new article of manufacture, a coaster toy comprising a spherical section concavo-convex circular pan for sliding upon inclined surfaces, a reinforced beaded edge about the rim of the pan, oppositely disposed pairs of apertures in the pan below the bead, flexible handles extending inwardly through the pairs of apertures terminating with knotted ends to confine the same and adapted to engage the ground surface when the pan is tilted in either direction to serve as brake shoes and to slow up and reverse the direction of rotation of the pan upon the changing of the center of gravity by the shifting of the weight of the occupant from one side to the other.

WILLIAM RUKA.

REFERENCES CITED

The following references are of record in the file of this patent:

UNITED STATES PATENTS

| Number | Name | Date |
|---|---|---|
| 424,164 | Bankson | Mar. 25, 1890 |
| 430,195 | Reimers | June 17, 1890 |
| 508,176 | Leggett | Nov. 7, 1893 |
| 1,357,940 | Berry | Nov. 9, 1920 |
| 1,712,703 | Hudson | May 14, 1929 |
| 2,061,664 | Lincoln | Nov. 24, 1936 |
| 2,219,905 | Prickman | Oct. 29, 1940 |
| 2,464,341 | Ostlund | Mar. 15, 1949 |